(12) United States Patent
Blair et al.

(10) Patent No.: US 6,511,730 B1
(45) Date of Patent: Jan. 28, 2003

(54) FIRE RESISTANT COMPOSITE PANEL

(75) Inventors: F. Dana Blair, Cambs (GB); George Edward Green, Cambs (GB)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 09/582,460

(22) PCT Filed: Mar. 14, 2000

(86) PCT No.: PCT/US00/06609

§ 371 (c)(1),
(2), (4) Date: Jun. 26, 2000

(87) PCT Pub. No.: WO00/73055

PCT Pub. Date: Dec. 7, 2000

(30) Foreign Application Priority Data

May 27, 1999 (EP) .......................... 993041201

(51) Int. Cl.[7] .................................. B32B 3/00
(52) U.S. Cl. ..................... 428/73; 428/116; 428/921; 428/178; 428/188; 52/783.1; 52/793.1; 52/794.1

(58) Field of Search ........................... 428/116–118, 73, 428/72, 920, 921, 174, 178, 188; 52/783.1, 793.1, 794.1

(56) References Cited

U.S. PATENT DOCUMENTS 4,288,491 A 9/1981 Surzhenko et al. ......... 428/332
4,557,961 A * 12/1985 Gorges

FOREIGN PATENT DOCUMENTS

EP 0 624 462 A1 11/1994 ........... B32B/19/06

* cited by examiner

Primary Examiner—Deborah Jones
Assistant Examiner—Wendy Boss
(74) Attorney, Agent, or Firm—Shapiro & Dupont LLP

(57) ABSTRACT

Structurally strong composite sandwich panels are made using phenolic resin adhesives to bond the face sheets to the honeycomb. Certain configurations and combinations of phenolic resins and fire protection agents were found to provide low flame, smoke and toxicity (FST) panels which have high structural strength.

21 Claims, 3 Drawing Sheets

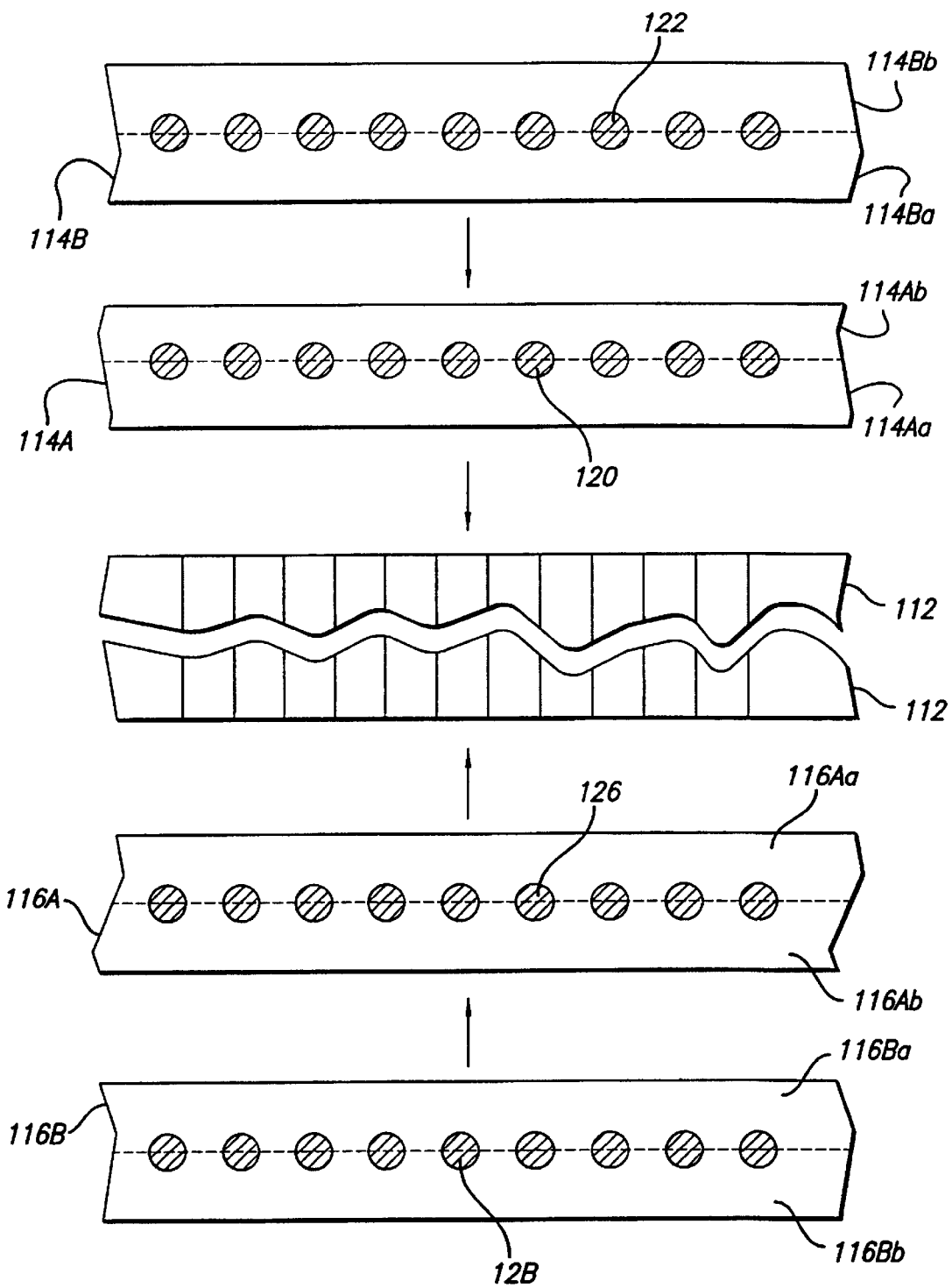

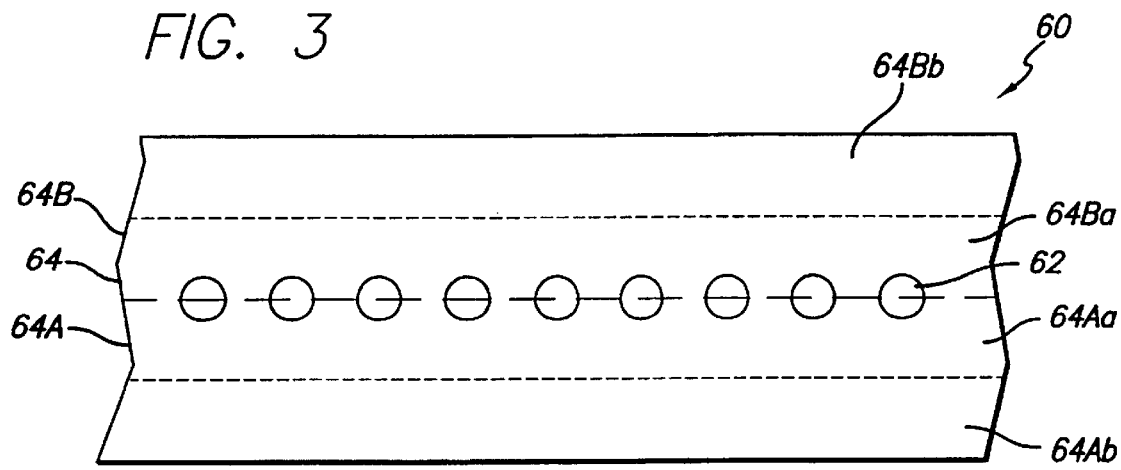
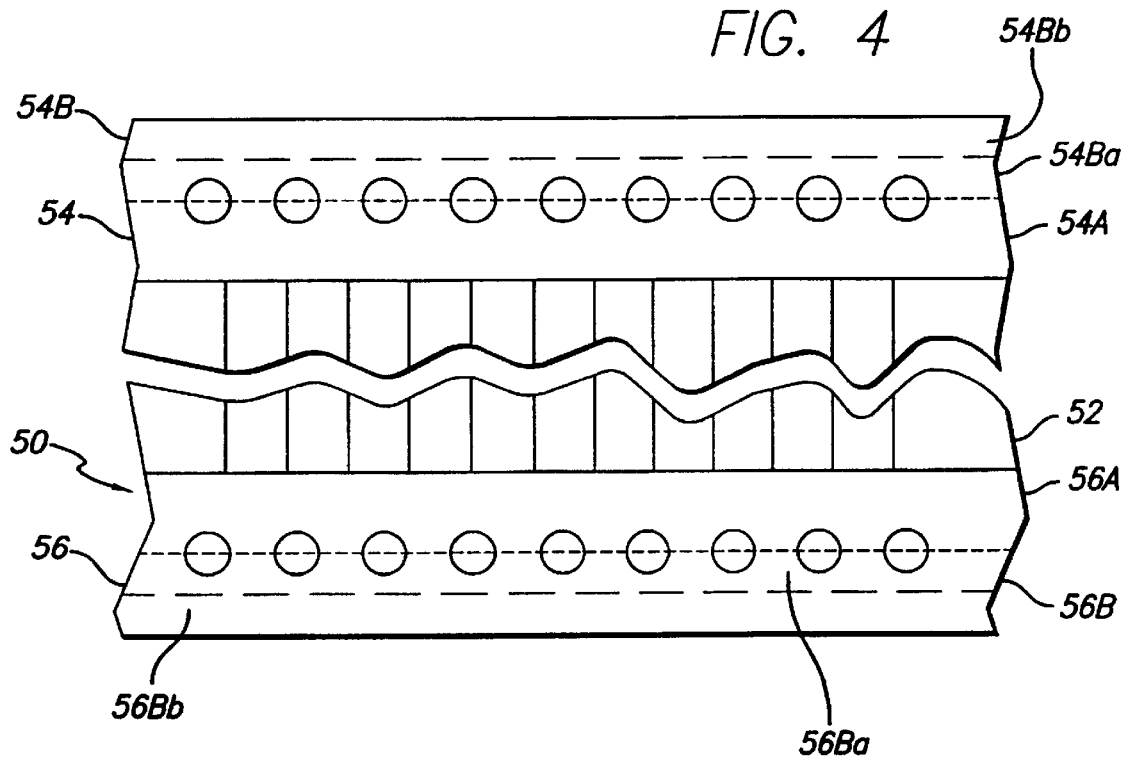

FIRE RESISTANT COMPOSITE PANEL

BACKGROUND OF THE INVENTION

1. Field of the Invention

The present invention relates generally to composite sandwich panels which are used in aerospace and other applications where light weight and high strength are required. More particularly, the present invention is directed to composite sandwich panels which are designed for use in an environment where flame resistance and/or fire protection is required.

2. Description of Related Art

Composite sandwich panels are widely used in aerospace and other industries where structures are required that are light weight and strong. The sandwich panels typically include a light weight central core structure which is sandwiched between two composite face sheets. The face sheets are adhesively bonded to the core. Various core structures are presently in use with the two main types being rigid foam and honeycomb. Rigid foam cores are advantageous because the face sheets contact the foam over a relatively large surface area which insures a strong bond. In many foam cores, the core will fracture before the adhesive bond between the face sheets and the core fails. Some disadvantages of rigid foam core are that light weight rigid foam is not particularly strong and the fire or flame resistance of many foams is not particularly good.

Honeycomb provides a number of advantages over rigid foam cores. Honeycomb cores, in general, provide much greater strength than rigid foam cores having the same density. In addition, honeycomb can be made from non-flammable materials such as aluminum and other light weight metals. One drawback of a honeycomb core is that the surface area which is available for bonding to the face sheets is much smaller than for foam cores. The honeycomb cells extend transversely between the face sheets so that the only surface available for bonding to the face sheets is the outer edges of the cells. As a result, the overall strength of the majority of honeycomb panels is significantly affected by the strength of the bond between the face sheets and the honeycomb.

Epoxy-based adhesives have been used to bond face sheets to honeycomb cores where the structural strength of the panel is important. For example, honeycomb sandwich panels used for aircraft flooring and other high stress structures have typically utilized epoxy-based adhesives to bond the face sheets to honeycomb core. Epoxy-based adhesives tend to burn relatively easily and produce large amounts of smoke. Attempts have been made to increase the fire resistance of epoxy adhesives by halogenating the adhesives. However, these attempts have not been entirely successful.

Phenolic adhesives are inherently more fire resistant than epoxy adhesives. However, phenolic resins do not have the same strong adhesive properties found in epoxy resins. As a result, phenolic adhesives have been limited to use in honeycomb sandwich panels which are not structural in nature. Such panels include aircraft interior side walls, ceilings and overhead bins.

SUMMARY OF THE INVENTION

In accordance with the present invention, it was discovered that structurally strong composite sandwich panels can be made using phenolic adhesives to bond the face sheets to the honeycomb. It was found that certain configurations and combination of phenolic resins and fire protection agents provide low flame, smoke and toxicity (FST) panels which have structural strengths which are equivalent to prior panels using epoxy-based adhesives.

The present invention is based upon a composite sandwich panel which has a core structure that includes a first face and a second face located on opposite sides of the core. At least one face sheet is adhesively bonded to one of the core faces. The face sheet has at least one fiber layer and includes an adhesive layer located adjacent to the face of the core structure. The face sheet further includes a fire protection layer which is located adjacent to the adhesive layer. The fire protection layer is also a phenolic resin. The phenolic resin in the fire protection layer includes a sufficient amount of one or more fire protection agents to provide the face sheet with a flammability level of below 20/20 as measured by the Ohio State University (OSU) heat release test.

Included within the present invention are face sheets which include a single fiber layer. In such single-ply face sheets, the single fiber layer is located between the adhesive layer and the fire protection layer. The phenolic adhesive is present in the adhesive layer in amounts sufficient to provide the necessary peel strength level of at least 80 N/76 mm. The fire protection layer may include a fire barrier layer located adjacent to the single fiber layer wherein the fire protection agent that is located within the fire barrier layer is a thermal barrier material. The fire protection layer also includes an intumescent layer which is located adjacent to the fire barrier layer if present. The intumescent layer includes one or more intumescent agents which are present in a phenolic resin.

The present invention also covers sandwich panels which utilize face sheets having multiple plies. The multiple-ply low FST, high-strength sandwich panels in accordance with the present invention include an inner ply which is made up of a first fiber layer located closest to the core structure and at least one outer ply which includes a second fiber layer wherein the second fiber layer is located within the fire protection layer. As one feature of the present invention, the phenolic adhesive layer in such multiple ply face sheets is located substantially between the interior side of the first fiber layer and the face sheet of the core structure. The fire protection layer begins on the exterior side of the first fiber layer and extends outward through the second ply and any additional plies. The fire protection layer may include only intumescent agents. The fire protection layer may include outer layers which incorporate only intumescent agents with one or more inner layers including thermal barrier material. The peel strength of such multiple ply face sheets is at least 130 N/76 mm.

The present invention is also directed to multiple ply face sheets wherein the phenolic adhesive is located on both sides of the first fiber layer. In this type of face sheet, the fire protection agents are located only in the second ply and/or optionally in additional plies.

The present invention is particularly well suited for use in the aerospace industry where structural panels must meet certain requirements for weight, strength, flammability, smoke and toxicity.

The above discussed and many other features and attendant advantages of the present invention will become better understood by reference to the following detailed description when taken in conjunction with the accompanying drawings.

BRIEF DESCRIPTION OF THE DRAWINGS

FIG. 2 is a diagrammatic representation of the formation of the sandwich panel shown in FIG. 1 wherein the two plies are prepared separately as pre-pregs and then applied to the honeycomb core to form the final sandwich panel.

FIG. 3 is a detailed diagrammatic representation of the single ply face sheet used to form the sandwich panel shown in FIG. 4.

FIG. 4 is a diagrammatic representation of an exemplary composite honeycomb sandwich panel which utilizes single-ply face sheets.

DETAILED DESCRIPTION OF THE INVENTION

Figure 1:
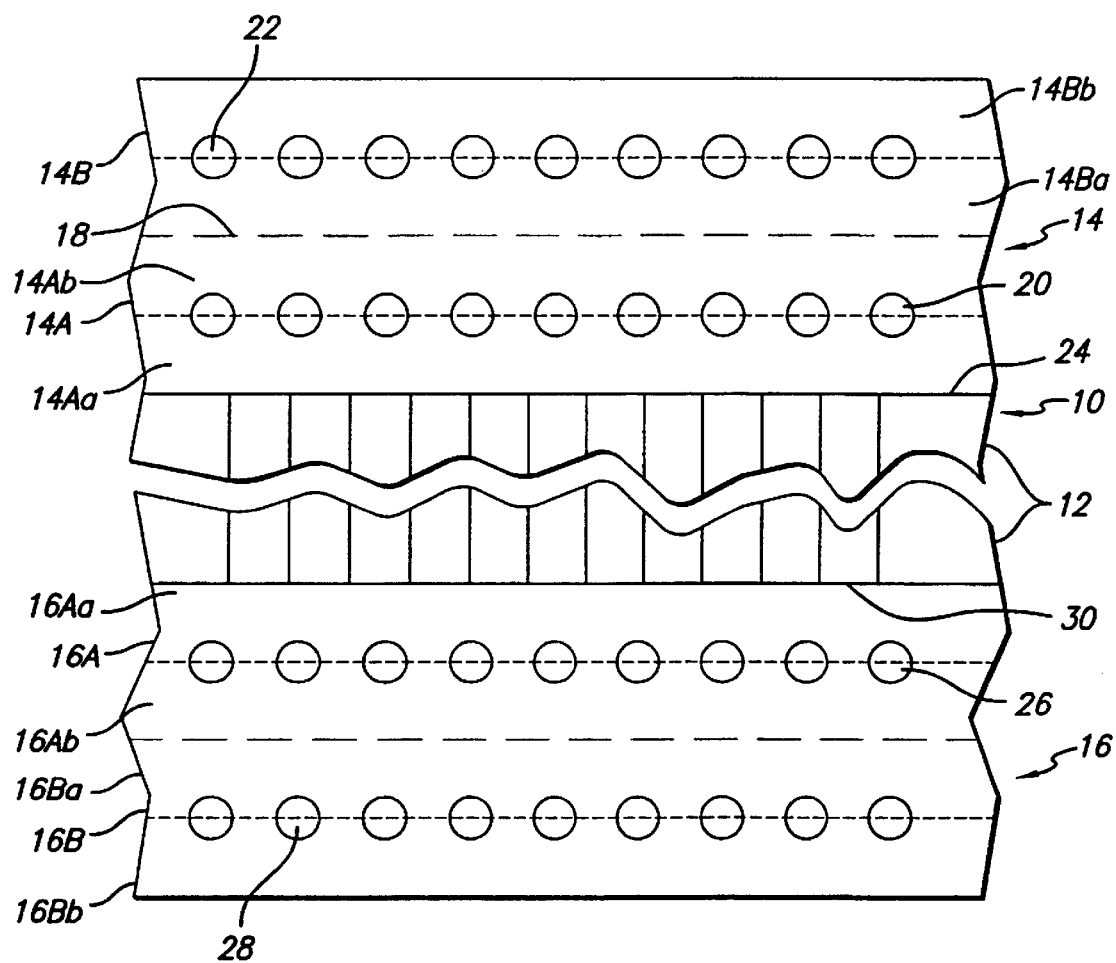
FIG. 1 is a schematic representation of an exemplary honeycomb composite sandwich panel which includes two-ply face sheets.

A composite sandwich panel in accordance with the present invention is shown diagrammatically at 10 in FIG. 1. The sandwich panel 10 includes a honeycomb core structure 12. Other core structure materials are possible including rigid foam and other lightweight materials commonly used in sandwich panels. However, the preferred core structure is honeycomb and the following detailed description will be limited to a description of the present invention as it applies to sandwich panels employing honeycomb cores. The honeycomb core 12 can be any of the common honeycomb materials used in aerospace sandwich panels. The honeycombs are typically made from aluminum or other lightweight metals. In addition, honeycombs made from various composite materials are suitable. Exemplary honeycomb materials include aramides paper cores, calendared kraft paper core including blends and glassine materials, flame retardant phenolic foam cores and metallic cores including aluminum foam filled cores. Although any number of honeycomb configurations are possible, the preferred honeycomb configuration employs hexagonally shaped cells. The wall thicknesses of the honeycomb cells may be varied to obtain the desired honeycomb core strength. Preferred honeycomb materials for use in accordance with the present invention are made from material marketed under the tradename NOMEX.

Referring again to FIG. 1, the composite sandwich panel 10 includes two face sheets shown at 14 and 16, respectively. In the preferred embodiment, the sandwich panel will include face sheets on both sides of the honeycomb core. However, the present invention does contemplate situations where only one face sheet is utilized. In such situations, the honeycomb core may require only one face sheet or may be located adjacent to a structural member or other element wherein the use of a second face sheet is not required. For exemplary purposes, all of the sandwich panels discussed herein will include a face sheet on both sides of the core.

The face sheets 14 and 16 may be identical or they may have different configurations. For the purpose of aiding in description of the invention, face sheets 14 and 16 will be described as having different configurations. However, it will be understood that in a preferred embodiment, both face sheets will have the same configuration.

Referring first to face sheet 14, the face sheet includes an inner ply 14A and an outer ply 14B. The boundary between the two plies 14A and 14B is represented by phantom line 18. The inner ply 14A includes a first fiber layer 20 which is located between resin layers 14Aa and 14Ab. The fiber layers described herein may be woven, unidirectional or random. Both resin layers 14Aa and 14Ab are composed of a phenolic adhesive which will be described in detail later. Preferably, the amount of phenolic adhesive in layers 14Aa and 14Ab will be approximately equivalent. However, asymmetric adhesive layers are contemplated within the present invention. The amount of phenolic adhesive present in each layer will vary depending upon a number of different factors including the type of fabric 20. It is preferred that the amount of phenolic adhesive used to form each layer 14Aa and 14Ab be from about 50 grams per square meter (gsm) to 250 gsm. The weight ratio of resin in layers 14Aa and 14Ab should range from 1 to 1 to 5 to 1. Ratios of 3 to 1 are preferred. The inner ply 14 should preferably have 40–67 weight percent resin and 33–60 weight percent fiber.

The outer ply 14B also includes two resin layers 14Ba and 14Bb in which a second fiber layer 22 is located. Phenolic resins including various fire protection agents are used to form the two layers 14Ba and 14Bb. These phenolic resins and fire protection agents will be described in detail below. In general, fire protection agents in accordance with this invention include either intumescent agents or thermal barrier materials. The phenolic resin layers 14Ba and 14Bb may both include intumescent agents or, alternatively, phenolic resin layer 14Ba may contain a thermal barrier material with layer 14Bb containing an intumescent agent.

The inner ply 14A forms an adhesive layer which is located adjacent to the face 24 of the core structure 12. As will be set forth in detail below, the amount and type of phenolic adhesive present in layers 14Aa and 14Ab are sufficient to provide a peel strength of the adhesive bond between the face sheet 14 and the honeycomb 12 which is at least 130 N/76 mm. Further, the outer ply 14B provides a fire protection layer which is located adjacent to the adhesive layer 14A. This fire protection layer 14B is a phenolic resin which includes a sufficient amount of fire protection agents as described below to provide the face sheet 14 with a flammability level of below 20/20 OSU.

The face sheet 16 is a second exemplary face sheet in accordance with the present invention. Face sheet 16 also includes two plies 16A and 16B. Ply 16A includes a first fabric layer 26 and outer ply 16B includes a second fabric layer 28. Ply 16A includes two resin layers 16Aa and 16Ab. Ply 16B includes two resin layers 16Ba and 16Bb. In this embodiment, the phenolic adhesive is located only in layer 16Aa which extends from the core structure face 30 to the interior side of the fabric layer 26. The resin layer 16Ab is a phenolic resin which may include an intumescent agent or a fire barrier material. The phenolic resin layers 16Ba and 16Bb may also include fire barrier material, however it is preferred that these two outer layers of resin include intumescent agents. In a preferred embodiment, the phenolic resin layer 16Ab will include fire barrier material, while the two outer layers 16Ba and 16Bb will include intumescent agents. In any event, the type and amount of phenolic adhesive as described below which is present in inner layer 16Aa is chosen to provide a peel strength of the adhesive bond between the face sheet 16 and honeycomb core 12 which is at least 130 N/76 mm. When only intumescent agents are used in layer 16Ab, 16Ba and 16Bb, the amounts of intumescent materials are chosen to provide a flammability level of below 20/20 OSU. When a fire barrier material is added to layer 16Ab, instead of intumescent agents, the flammability level for the face sheet 16 may be lowered to levels below 15/15 OSU and in some cases even below 10/10 OSU.

FIG. 2 is a diagrammatic representation of the fabrication process for the sandwich panel shown in FIG. 1 wherein the various plies are first formed as individual fabric layers which are impregnated with the various layers of resin. Such uncured plies are conventionally referred to as a "pre-preg." The various pre-preg plies are placed against the honeycomb core as shown in FIG. 2 and cured to form the final sandwich panel as shown in FIG. 1. In FIG. 2, a "1" has been placed in front of the numbers which correspond to the numbers used to identify the elements in FIG. 1 to highlight the fact that the various plies shown in FIG. 2 are in an uncured state.

The two-ply face sheet is a preferred configuration since the use of two fabric layers provides adequate structural and peel strength without increasing the weight of the sandwich panel disproportionately. If desired, however, additional plies may be included in the face sheet either on top or in between the plies as shown in FIG. 1. The unidirectional plies may include resin layers which have a variety of different combinations of fire protection agents to provide fire protection, if desired. Although double ply face sheets are preferred for many different situations, there are instances in which a single ply face sheet is desirable. Such single plies in accordance with the present invention will have peel strengths of 80 N/76 mm or above.

An exemplary embodiment of a sandwich panel employing a single-ply face sheet is shown at 50 in FIG. 4. The single-ply sandwich panel 50 includes a honeycomb core 52 which may be made from the same materials used to fabricate previously described honeycomb 12. The sandwich panel 50 includes single-ply face sheets 54 and 56. Again, for descriptive purposes, the two face sheets 54 and 56 will be described as having different resin layer configurations. It will again be understood that the face sheets on either side of the honeycomb 52 may be the same or the sandwich panel may be an open face sandwich panel in which a face sheet is located on only one side of the panel.

A generic single-ply, pre-preg laminate prior to curing to form face sheet 54 or 56 is shown in FIG. 3 at 60. The pre-preg includes a fabric layer 62 which is located within resin matrix 64. The resin matrix 64 includes layer 64A and 64B which are located on opposite sides of the fiber layer 62. The resin layer 64A may include a single resin layer or, if desired, different resins may be applied to form two layers 64Aa and 64Ab as represented by phantom line 66. In the same fashion, the resin layer 64B may, if desired, be applied as two different resin layers 64Ba and 64Bb. The procedures for forming pre-pregs wherein different resin layers are applied to opposite sides of the fiber layer and wherein multiple resin layers are applied to each side are known and will not be described in detail.

Exemplary pre-pregs which may be used to form sandwich panels having single-ply face sheets include those where resin layer 64Aa and 64Ab are both a phenolic adhesive, while layer 64Ba is a phenolic resin containing a thermal barrier material and resin layer 64Bb contains an intumescent material. Alternatively, both layers 64Ba and 64Bb may contain intumescent agents only. As a further exemplary embodiment, resin layer 64Ab may contain a phenolic adhesive with resin layers 64Aa, 64Ba and 64Bb containing a combination of fire barrier materials and intumescent agents.

Referring again to FIG. 4, face sheet 54 includes an adhesive layer 54A which is entirely phenolic adhesive. The outer layer 54B includes an inner layer 54Ba and an outer layer 54Bb which are made up of phenolic resin which contains intumescent agents. The single-ply face sheet 56 is the same as single-ply face sheet 54 in that the inner resin layer 56A contains only phenolic adhesive. However, the outer resin layer 56B includes an inner layer 56Ba which contains fire barrier material and an outer layer 56Bb which contains intumescent agents. The two face sheets 54 and 56 shown in FIG. 4 are exemplary only, with it being understood that other combinations of phenolic adhesive, intumescent agents, and fire barrier materials are possible within the four different resin layers provided that the requirements of peel strength and flammability as set forth above are met.

A sandwich panel was prepared having a face sheet corresponding to face sheet 14 in FIG. 1. The honeycomb core 12 was made from aramides material expanded into a honeycomb having hexagonal cells. The honeycomb is made from phenolic dipped NOMEX and has a density of 80 kg/m$^3$ and a cell size of 3 mm. The honeycomb is available commercially from Hexcel Corp. (Duxford, England) under the commercial name A1-80-3. The outer ply 14B included a fiber layer 22 formed from fiberglass fabric commonly referred to as style 7781. The resin used to form resin layers 14Ba and 14Bb was DDP5235 phenolic resin which is available from Dynochem Ltd. (Mold, United Kingdom).

The phenolic resin in layers 14Ba and 14Bb included 30 weight percent of EXOLIT intumescent material. The specific type of EXOLIT material used in resins 14Bb and 14Ba was AP423. EXOLIT is a registered trademark of Clariant Specialties, Ltd. (Middlesex, United Kingdom). Although in this particular example, EXOLIT was used as the preferred intumescent material. Other suitable intumescent materials may be substituted for EXOLIT, including any of the other known intumescent agents such as melamine monophosphate; ammonium polyphosphate; microencapsulated with melamine-formaldehyde resin; halogen-free phosphorous polyall; ammonium polyphosphate with phosphorous/nitrogen synergism; diphenyl cresolphosphate; tricresolphosphate; triphenylphosphate; trixylenylphosphate, such as ANTIBLAZE. ANTIBLAZE is a tradename for low molecular weight intumescent material available from Albright and Wilson UK Ltd. (West Midlands, United Kingdom).

In this particular example, the intumescent phenolic resin was impregnated into fiberglass layer 22 to form resin layers 14Ba and 14Bb which each contained 123 grams per square meter. If desired, the amount of resin in each layer can be varied between 100 and 150 gsm. In addition, the amount of intumescent material present in each layer may be varied from 20 weight percent to 40 weight percent. The inner ply 14A was prepared using the same fiberglass fabric as ply 14B. The two resin layers 14Aa and 14Ab were formed using a phenolic resole resin having a thermoplastic dissolved in it. Suitable exemplary adhesives include phenolic resole resins with dissolved polyurethane, such as ESTANE (B. F. Goodrich Specialty Plastics, Cleveland, Ohio) or BUTVAR (Solutia Inc., St. Louis, Mo.) which is a polyvinyl butyral which can be dissolved in phenolic resole. Another suitable adhesive is a phenolic resole resin toughened with a silicone-based modifier such as GP790D62 available from Georgia Pacific (Atlanta, Ga). Phenolic resole resins with other compatible thermoplastics are also suitable. The fiberglass fabric 20 in ply 14A was impregnated with equal amounts of the phenolic adhesive on both sides to form resin layers 14Aa and 14Ab which each included 134 grams of resin per square meter.

The two plies 14A and 14B were laminated onto the aramides honeycomb core and cured on a flat platten. The curing cycle involved heating the laminate at a rate of 10° C./minute to 115° C. and then holding for 30 minutes. The laminate was then further heated at a rate of 5° C./minute to 130° C. and held there for one hour.

A panel made according to the above described procedure was found to have a climbing drum peel (CDP) strength of 226 N/76 mm. The climbing drum peel test for adhesives is described in ASTM designation: D1781-76 (re-approved 1986). This test measures the strength of the bond between the face sheet and the honeycomb core. This exemplary panel was also tested for heat release using the Ohio State University (OSU) heat release test described in "Heat Release in Fires" edited by B. Babraushkas and S. J. Grayson; *El Sevier Applied Science,* Pages 13–17, first edition, 1992. This heat release test measures the heat released for the duration of the test from the moment the specimen is inserted into a controlled exposure chamber and encompasses the period of ignition and progressive flame involvement of the surface of the specimen. The measurement tests peak heat release rate and total heat release rate. The OSU test results are expressed as Peak Heat Release Rate/Total Heat Release Rate for a 2-minute period (Peak HRR/Total HRR, 2 min.). Peak HRR is expressed as $kW/m^2$ and Total HRR is expressed as $kWmin/m^2$. The units are usually dropped from the OSU test results so that they are typically expressed simply as a number ratio (e.g. 20/20).

A legal requirement of current aircraft regulations is a maximum level for OSU of 65/65. The majority of current honeycomb sandwich panels have OSU values of about 40/40 and above. The OSU value for the panel as described above was found to be 16.86/17.37. This OSU value falls within the required limit of the present invention of OSU values being below 20/20. Further, the peel strength of 226 N/76 mm is considerably above the lower limit of peel strengths required in accordance with the present invention. In alternate embodiments, the amounts of resin in each layer may be varied within the limits set forth above, provided that the peel strength remains above 130 N/76 mm for multiple ply face sheets (80 N/76 mm for single ply sheets) and the heat release remains below 20/20.

A second exemplary panel was prepared in accordance with the present invention having a face sheet of the type shown at 16 in FIG. 1. The sandwich panel utilized the same honeycomb and fiberglass material which was used in the preceding example. In this example, the phenolic resin used in layers 16Bb and 16Ba was the same resin as used in previously-described layer 14. The phenolic resin layer also included the same amount of intumescent material and layers 16Ba and 16Bb each included 123 grams of resin per square meter.

With respect to the inner ply, layer 16Ab included a phenolic resin in which a thermal barrier material was dispersed. The phenolic resin utilized was XDF4329. This particular resin is available from Dynochem UK Ltd. (Mold, United Kingdom). The thermal barrier material added to the phenolic resin is a blend of silica powdered materials marketed under the tradename "Ceepree." Ceepree is available from Cepree Products Ltd. (Southport, United Kingdom). The amount of Ceepree added to the XDF4329 phenolic resin was about 30 weight percent. The amount of Ceepree added to the resin can be varied between 10 weight percent and 40 weight percent. Other suitable thermal barrier materials which may be substituted for the Ceepree include vermiculite; deshotted mineral fibers (for example, those sold under the tradename INORPHIL by Laxa-Bruk (Laxa, Sweden)); hollow silica spheres (for example, those sold under the tradename FILLITE by Fillite Ltd. (Cheshire, United Kingdom)); and mica.

The fiberglass fabric 26 was impregnated with sufficient phenolic resin containing Ceepree to provide a layer 16Ab which contained 50 grams of resin per square meter. The phenolic adhesive was limited to layer 16Aa and was applied to glass fabric 26 in an amount sufficient to provide an adhesive layer 16Aa which contained 200 grams of resin per square meter. If desired, the amount of fire barrier resin in layer 16Ab can be varied between 30 and 70 gsm. Also, the amount of phenolic adhesive present in layer 16Aa may be varied between 50 and 250 gsm. The ratio between the amount of resin in adhesive layer 16Aa and resin layer 16Ab should be between 1 to 1 and 5 to 1. Ratios of 3 to 1 are preferred.

The face sheet 16 which was prepared as described above had a peel strength of 232.5 N/76 mm. The face sheet also exhibited a heat release of 11.67/8.27 OSU. In comparing the above two examples, it was surprisingly discovered that the peel strength for the second example (face sheet 16) had a higher peel strength than the first example (face sheet 14) even though the amount of adhesive resin used in face sheet 16 was 68 gsm less than the total amount of adhesive used in face sheet 14. Further, the inclusion of a thermal barrier in layer 16Ab provided a substantial reduction in heat release. Accordingly, face sheets of the type shown at 16 in FIG. 1 are particularly preferred. These type of face sheets may be prepared by varying the various amounts of resins, intumescent materials and thermal materials as described in the previous example, provided that the peel strength remains above 130 N/76 mm and the OSU heat release remains below 20/20.

A number of additional comparative panels were prepared. For example, a sandwich panel was prepared using the same honeycomb core and fiberglass matting as was used in the prior two examples. The face sheet was a two-ply face sheet prepared in the same manner as described in the prior examples, and all four resin layers Aa, Ab, Ba, and Bb each contained 120 grams per square meter of the phenolic adhesive used in the prior examples. Fifteen weight percent intumescent was included in one of the outer layers. The peel strength of the panel was 180 N/76 mm. Although this particular panel meets the peel strength requirements of the present invention, it was surprising to find that a face sheet using phenolic adhesive and only 15 weight percent intumescent (EXOLIT) had peel strength levels below the prior two examples in accordance with the present invention which both required the use of intumescent agents and/or thermal barrier materials in greater amounts necessary to meet the OSU 20/20 limits. This particular comparative example falls outside the present invention since the OSU heat release was found to be 36.9/32.5

A second comparative example was conducted in which the same phenolic resin with EXOLIT intumescent agent was used to form layers Ab, Ba, and Bb. The resin was the same as that used in the prior examples with the amount of resin in each layer being 123 gsm. In this comparative example, the adhesive layer Aa was formed using an epoxy adhesive. The epoxy adhesive was present in layer Aa in an amount equal to 134 gsm. The peel strength of this two-ply face sheet utilizing an epoxy adhesive was only 110 N/76 mm.

In a further comparative example, a sandwich panel was prepared which was identical to the previously-described panel utilizing an epoxy adhesive, except that the phenolic adhesive (BSL840) was substituted in place of the epoxy adhesive. As expected, the peel strength of this two-ply face sheet was even lower at a level of 103 N/76 mm. In another comparative example, a sandwich panel was made in the same manner as the prior examples, except that the resin present in the various layers was as follows:

Layer Bb—123 gsm DDP5235 phenolic resin with 30 weight percent EXOLIT AP 423.

Layer Ba—123 gsm DDP5235 phenolic resin with 30 weight percent EXOLIT AP 423.

Layer Ab—DDP5235 phenolic resin with EXOLIT AP 750 at 123 gsm.

Layer Aa—XDF4329 phenolic resin with 15 weight percent ANTIBLAZE and 5 weight percent BUTVAR B98.

The peel strength for the above face sheet was found to be 71 N/76 mm.

In an additional example, a sandwich panel was made in the same manner as the above examples with the following resin layer configuration:

Layer Bb—DDP5235 phenolic resin with 30 weight percent EXOLIT AP 423 at 123 gsm.

Layer Ba—DDP5235 phenolic resin with 30 weight percent EXOLIT AP 423 at 123 gsm.

Layer Ab—XDF4329 phenolic resin with 30 weight percent BUTVAR B98 and 4 weight percent graphite powder at 100 gsm.

Layer Aa—XDF4329 phenolic resin with 30 weight percent BUTVAR B98 and 4 weight percent graphite powder at 150 gsm.

The above double-ply face sheet was found to have a peel strength of only 121 N/76 mm.

The preceding examples and comparative examples have been limited to two ply face sheets which are the preferred embodiment. The present invention also covers one-ply face sheets as set forth in FIGS. 3 and 4 provided that the peel strength is at least 80 N/76 mm and the OSU heat release is below 20/20. Single ply face sheets having peel strengths of at least 130 N/76 mm are possible provided that a sufficiently strong single layer fabric is chosen.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments, but is only limited by the following claims.

What is claimed is:

1. A composite sandwich panel comprising:

a core structure which comprises a first face and a second face located on opposite sides of said core structure;

at least one face sheet which is adhesively bonded to either said first face or said second face of said core structure, said face sheet comprising:

an adhesive layer located adjacent to said face of the core structure, said adhesive layer consisting essentially of a phenolic adhesive wherein the peel strength of the adhesive bond between said face sheet and said core structure is at least 80 N/76 mm;

a fire protection layer, located adjacent to said adhesive layer, said fire protection layer comprising a phenolic resin and a sufficient amount of one or more fire protection agents to provide said face sheet with a flammability level of below 20/20 OSU wherein said one or more fire protection agents are dispersed in said phenolic resin; and at least one fiber layer located within said face sheet.

2. A composite sandwich panel according to claim 1 wherein said face sheet is a single ply face sheet which comprises a single fiber layer.

3. A composite sandwich panel according to claim 2 wherein said fire protection layer comprises a fire barrier layer that comprises a first fire protection agent that consists essentially of a thermal barrier material, said fire protection layer further comprising an intumescent layer located adjacent to and integral with said fire barrier layer, said intumescent layer comprising a second fire protection agent that consists essentially of an intumescent agent.

4. A composite sandwich panel according to claim 1 wherein said face sheet is a multiple ply face sheet which comprises an inner ply comprising a first fiber layer located closest to said core structure and at least one outer ply comprising a second fiber layer wherein said second fiber layer is located within said fire protection layer and wherein the peel strength of the adhesive bond between said face sheet and said core structure is at least 130 N/76 mm.

5. A composite sandwich panel according to claim 4 wherein said first fiber layer comprises an interior side located closest to said core structure and an exterior side and wherein said adhesive layer is located substantially between the interior side of said first fiber layer and the face of said core structure.

6. A composite sandwich panel according to claim 5 wherein said inner ply comprises an exterior resin layer located directly adjacent to and in contact with the exterior side of said first fiber layer wherein said exterior resin layer includes a fire protection agent dispersed therein to thereby form at least a portion of said fire protection layer.

7. A composite sandwich panel according to claim 6 wherein the fire protection agent present in the exterior resin layer of said inner ply consists essentially of a thermal barrier material.

8. A composite sandwich panel according to claim 7 wherein said outer ply comprises a fire protection agent that consists essentially of one or more intumescent agents.

9. A composite sandwich panel according to claim 7 wherein the ratio between the amount of phenolic adhesive resin in said adhesive layer and the amount of phenolic resin in said exterior resin layer is between 1 to 1 and 5 to 1.

10. A composite sandwich panel according to claim 9 wherein the ratio between the amount of phenolic adhesive resin in said adhesive layer and the amount of phenolic resin in said exterior resin layer is about 3 to 1.

11. A composite sandwich panel according to claim 8 wherein said face sheet is a double ply face sheet.

12. A composite sandwich panel according to claim 4 wherein said first fiber layer comprises an interior side located closet to said core structure and an exterior side and wherein said inner ply further comprises an interior resin layer located between the interior side of said first fiber layer and the face of said core structure and an exterior resin layer located directly adjacent to and in contact with the exterior side of said first fiber layer, wherein said interior and exterior resin layers consist essentially of phenolic adhesive to form said adhesive layer.

13. A composite sandwich panel according to claim 12 wherein said outer ply comprises an interior resin layer located between said second fiber layer and said first ply and an exterior resin layer located on the other side of said second fiber layer, wherein said interior and exterior resin layers of said outer ply both comprise fire protection agents which consist essentially of intumescent agents.

14. A composite sandwich panel according to claim 12 wherein said outer ply comprises an interior resin layer located between said second fiber layer and said first ply, said outer ply further comprising an exterior resin layer located on the other side of said second fiber layer, wherein said interior resin layer of said outer ply comprises a fire protection agent consisting essentially of a fire barrier material and wherein said exterior resin layer of said outer ply comprises a fire protection agent consisting essentially of an intumescent agent.

15. A composite sandwich according to claim 12 wherein the ratio between the amount of phenolic adhesive resin in said interior resin layer of said inner ply and the amount of phenolic adhesive resin in said exterior resin layer of said inner ply is 1 to 1.

16. A composite sandwich panel according to claim 12 wherein the amount of resin in said inner or outer ply is between 40 to 67 weight percent.

17. A composite sandwich panel according to claim 13 wherein said face sheet is a double ply face sheet.

18. A composite sandwich panel according to claim 1 wherein said core structure is a honeycomb wherein the cells of said honeycomb extend transversely between said first and second faces of said honeycomb.

19. A composite sandwich panel according to claim 1 which comprises a face sheet adhesively bonded to the first face of said core structure and a second face sheet adhesively bonded to the second face of said core structure.

20. A composite sandwich panel according to claim 19 wherein said first and second face sheets are substantially the same.

21. A composite sandwich panel according to claim 2 wherein said single fiber layer comprises an interior side located closest to said core structure and an exterior side and wherein said adhesive layer is located substantially between the interior side of said single fiber layer and the face of said core structure.

* * * * *